Jan 6, 1931.  B. JEROME  1,787,786
BRAKE CROSS SHAFT CONSTRUCTION
Filed March 12, 1928
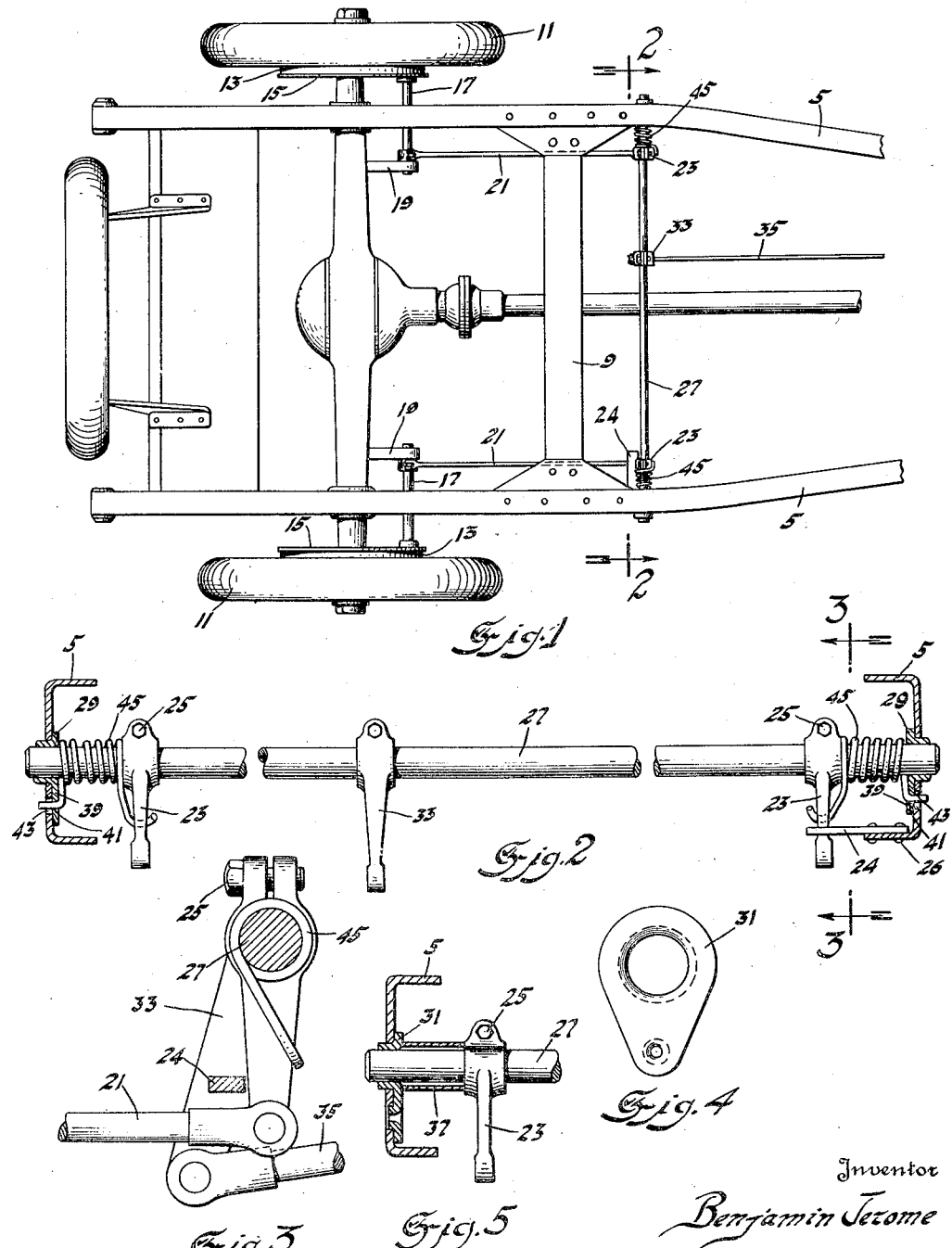

Patented Jan. 6, 1931

1,787,786

UNITED STATES PATENT OFFICE

BENJAMIN JEROME, OF LANSING, MICHIGAN, ASSIGNOR TO GENERAL MOTORS CORPORATION, OF DETROIT, MICHIGAN, A CORPORATION OF DELAWARE

BRAKE CROSS-SHAFT CONSTRUCTION

Application filed March 12, 1928. Serial No. 260,952.

This invention relates to an improvement in brake operating means for vehicles.

An object of the invention is to associate with a rockshaft an anti-rattling spring having the additional function of a come-back spring, a spring to return the shaft to its initial position after brake application.

As another object, the invention seeks to employ such a spring to secure from rotation relative to the chassis frame the bushings which are carried by the frame and in which the rockshaft is journaled.

Other objects and advantages will be understood from a reading of the following description and an examination of the accompanying drawing.

In the drawing:

Figure 1 is a plan view of a portion of a vehicle chassis.

Figure 2 is a view of a cross-shaft in elevation, the frame members being in section and the view taken on line 2—2 of Figure 1.

Figure 3 is a sectional view on line 3—3 of Figure 2.

Figure 4 is a view in elevation of a detail.

Figure 5 shows in section a modified form.

Referring by reference characters to the drawing, numeral 5 represents the longitudinal frame bars of the chassis. There may be cross-bars associated with the longitudinal bars, one such cross-bar being represented by numeral 9 and numeral 11 shows the wheels.

The invention herein disclosed may be used with rear wheel brakes only, or with brakes on both front and rear wheels. It is shown as related to the brakes on the rear wheels.

On each wheel is a brake drum 13, the inner open end of which drum is closed by a fixed dust plate or backing plate 15 carried by the axle, as usual. Within the enclosure defined by the drum and backing plate is to be located any suitable brake means. Such braking means may be actuated by any suitable applying means including a shaft extending into the drum enclosure. Such a shaft is shown on the drawing and designated by numeral 17. To provide a second shaft bearing, the axle is equipped with brackets 19, one such bracket being located adjacent each axle end.

Rocking of the shaft 17 serves in a well understood way to apply the brake. Shaft 17 is rocked by rod 21 connected to a shaft lever arm and to lever arms 23 clamped to a transverse rockshaft 27 by suitable clamping means 25. This rockshaft 27 is journaled in bushings 29, 29 which are received in aligned openings provided therefor in the frame members 5. Shaft 27 has an intermediately located lever arm 33 which is downwardly extended and which is to be connected by a rod 35 extending forwardly therefrom to a suitable brake operating member. Any desired means may be used to pull upon rod 35. Such pull operates to rock shaft 27, which through a pull upon rods 21 rotates shafts 17 and applies the brakes. Inasmuch as the arrangements for operating rod 35 constitute no part of the invention, no further description or illustration may be given.

On shaft 27 adjacent the bearing bushing 29 is a spring 45 surrounding shaft 27 and positioned between the hub of the adjacent lever 23 and the bushing. The spring has one end extended tangentially and then bent at an angle, the angled end extended through the aligned openings 41 of the bushing and 43 of the frame. At its other end the spring is also extended tangentially and hooked over arm 23. A similar spring 45 is shown at the other end of shaft 27 between the other arm 23 and the bushing 29. This other spring has its ends similarly attached.

Upon rotation of shaft 27 by the brake applying means, the springs 45 are tensioned with the result that when the brake applying force is released, the torsion of the springs restores the shaft 27 to a predetermined position of release. This release position is fixed by means of a plate 24 secured to the lower flange of the channel frame member by fastening means 26, the plate extending into the path of movement of the lever arm 23.

In such action it will be understood that ends of the springs anchored to the frame permit the tensioning of the springs when the brake is applied. Each spring therefore acts as a torsion spring to restore shaft 27 to a predetermined position after brake application. Each spring serves also to lock bushing 29 from rotation relative to the frame, the spring end being extended through apertures in bushing and frame. The springs serve also as compression springs between the bushings and lever hubs to resiliently resist axial shaft movement and prevent rattling.

It will be understood that while the brake shown is an internal brake, this showing is merely illustrative of any brake; also that the invention relating to the cross shaft might be applied to the cross shaft used in connection with front wheel brakes, the showing with rear wheel brakes being merely illustrative of its use with wheel brakes at an end of a vehicle. It is equally obvious that such a shaft arrangement may be adopted for use with brakes both at the front wheels and rear wheels where four wheel brakes are used.

In Figure 4 and Figure 5 is illustrated a slight modification. In this form a sleeve 37 may replace one of the springs 45. With this arrangement a single spring 45 serves to return the shaft 27. This single spring is used to anchor and hold from rotation its bushing 29 as in Figure 2. The thrust of the spring through the shaft 27 exerts pressure through the hub of the remote lever 23 (Figure 5) and through the sleeve upon the bushing 31. This bushing 31 is held by compression against the frame web and its apertured portion corresponding to aperture 41 of bushing 29 is struck up to form a lug entering the frame opening whereby this bushing 31 is kept from rotation. In other respects the construction is like that of Figure 2.

I claim:

1. In brake mechanism, longitudinal frame members, aligned bushings carried thereby, a rockshaft journaled in said bushings, said bushings having radial extensions provided with openings, said frame members having aligned openings, means surrounding said shaft and operable to exert a longitudinal thrust on said rock shaft, said means including a part extending through said aligned frame and bushing openings to lock said bushings from rotation.

2. In brake mechanism, frame members, aligned bushings carried thereby, a rockshaft journaled in said bushings, one of said bushings having a radial extension, said extension and said frame having aligned openings, a spring surrounding said rockshaft adjacent said bushing, one end of said spring extended through said aligned openings, the other end of said spring anchored to said shaft.

3. The invention set forth in claim 2, said rockshaft having a lever arm and a stop on said frame to limit the rotation of said shaft.

4. In brake mechanism, side frame members, a rock-shaft terminally carried thereby, brake applying means operably connected to said rock shaft, resilient means exerting a longitudinal thrust on said rock shaft, said resilient means being fixedly anchored at one end and attached to said shaft at its other end to exert a torsional resistance to shaft rotation.

5. The invention defined by claim 4, together with an abutment on said frame and a co-operating member on said shaft to limit rotation of said shaft under the influence of said resilient means.

In testimony whereof I affix my signature.

BENJAMIN JEROME.